US010693976B2

(12) United States Patent
Jacquenet et al.

(10) Patent No.: US 10,693,976 B2
(45) Date of Patent: Jun. 23, 2020

(54) METHOD AND SYSTEM FOR DYNAMIC DISCOVERY OF SERVICE FUNCTIONS

(71) Applicant: Orange, Paris (FR)

(72) Inventors: Christian Jacquenet, Pont Pean (FR); Mohamed Boucadair, Betton (FR)

(73) Assignee: ORANGE, Paris (FR)

(*) Notice: Subject to any disclaimer, the term of this patent is extended or adjusted under 35 U.S.C. 154(b) by 898 days.

(21) Appl. No.: 15/030,303

(22) PCT Filed: Oct. 14, 2014

(86) PCT No.: PCT/FR2014/052616
§ 371 (c)(1),
(2) Date: Apr. 18, 2016

(87) PCT Pub. No.: WO2015/055945
PCT Pub. Date: Apr. 23, 2015

(65) Prior Publication Data
US 2016/0248859 A1 Aug. 25, 2016

(30) Foreign Application Priority Data
Oct. 18, 2013 (FR) .................................... 13 60210

(51) Int. Cl.
*H04L 29/08* (2006.01)
*H04L 29/12* (2006.01)
(Continued)

(52) U.S. Cl.
CPC .......... *H04L 67/16* (2013.01); *H04L 41/0816* (2013.01); *H04L 61/1541* (2013.01);
(Continued)

(58) Field of Classification Search
None
See application file for complete search history.

(56) References Cited

U.S. PATENT DOCUMENTS 5,497,368 A * 3/1996 Reijnierse ............... H04L 45/04
370/351
6,567,380 B1 * 5/2003 Chen ...................... H04L 45/02
370/238
(Continued)

OTHER PUBLICATIONS

International Search Report and Written Opinion dated Jan. 21, 2015 for corresponding International Application No. PCT/FR2014/052616, filed Oct. 14, 2014.
(Continued)

*Primary Examiner* — Jeffrey R Swearingen
(74) *Attorney, Agent, or Firm* — David D. Brush; Westman, Champlin & Koehler, P.A.

(57) ABSTRACT

A method is provided for dynamic discovery of service functions in an IP network including at least one PDP, responsible for taking decisions relative to the structuring of a service based on a set of service functions, called SF functions, and for notifying other nodes of the IP network of these decisions, and at least one SF node, associated with at least one SF function hosted at the SF node or accessible via the SF node. The method includes: the PDP node receives an announcement message sent by the SF node, the announcement message indicating at least one identifier and the location of the SF function associated with this SF node; and the PDP node updates a list of SF functions on the basis of information taken from the announcement message. The method can be applied to value added services, for example in an OSPF network.

15 Claims, 2 Drawing Sheets

(51) Int. Cl.
*H04L 12/24* (2006.01)
*H04L 29/06* (2006.01)

(52) U.S. Cl.
CPC ...... *H04L 67/2838* (2013.01); *H04L 61/1511* (2013.01); *H04L 61/251* (2013.01); *H04L 63/20* (2013.01)

(56) References Cited

U.S. PATENT DOCUMENTS

| | | | | |
|---|---|---|---|---|
| 2002/0095488 | A1* | 7/2002 | Primak | H04L 12/1868 709/223 |
| 2002/0194323 | A1 | 12/2002 | Chantrain et al. | |
| 2011/0158088 | A1* | 6/2011 | Lofstrand | G06F 9/465 709/223 |
| 2012/0089727 | A1* | 4/2012 | Raleigh | H04L 12/14 709/224 |
| 2012/0324100 | A1* | 12/2012 | Tomici | H04L 45/123 709/224 |
| 2016/0227471 | A1* | 8/2016 | De Foy | H04W 48/18 |

OTHER PUBLICATIONS

Boucadair et al., Service Function Chaining: Framework & Architecture; draft-boucadair-sfc-framework-00.txt, Service Function Chaining: Framework & Architecture; draft-boucadair-sfc-framework-00.txt, Internet Engineering Task Force, IETF; Standardworkingdraft, Internet Society (ISOC) 4, Rue Des Falaises CH- 1205 Geneva, Switzerland, Oct. 3, 2013 (Oct. 3, 2013), pp. 1-24, XP015092848.
Guttman et al., "RFC 2608—Service Location Protocol, Version 2", Internet Citation, Jun. 1999 (Jun. 1999), XP002193190.
English translation of the International Written Opinion dated Jan. 21, 2015 for corresponding International Application No. PCT/FR2014/052616, filed Oct. 14, 2014.
Samir Ghamri-Doudane et a., "Hierarchical Policy Based Management Architecture to Support the Deployment and the Discovery of Services in Ubiquitous Networks", Proceedings of the 29th Annual IEEE International Conference on Local Computer Networks (LCN'04), Nov. 16-18, 2004.
Machine translation of Communication from the Examining Division dated Apr. 4, 2019 for corresponding EP Application No. 14796813.5.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            LS age             |    Options    |      10       |
+-+-+-+-+-+-+-+-+-+-+-+-+-+-+-+-+-+-+-+-+-+-+-+-+-+-+-+-+-+-+-+-+
|   SFC LSA ID  |                    Instance                   |
+-+-+-+-+-+-+-+-+-+-+-+-+-+-+-+-+-+-+-+-+-+-+-+-+-+-+-+-+-+-+-+-+
|                       Advertising Router                      |
+-+-+-+-+-+-+-+-+-+-+-+-+-+-+-+-+-+-+-+-+-+-+-+-+-+-+-+-+-+-+-+-+
|                       LS sequence number                      |
+-+-+-+-+-+-+-+-+-+-+-+-+-+-+-+-+-+-+-+-+-+-+-+-+-+-+-+-+-+-+-+-+
|         LS checksum           |            Length             |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                             Value                             |
.                                                               .
.                                                               .
.                                                               .
+-+-+-+-+-+-+-+-+-+-+-+-+-+-+-+-+-+-+-+-+-+-+-+-+-+-+-+-+-+-+-+-+
```

FIG. 4

METHOD AND SYSTEM FOR DYNAMIC DISCOVERY OF SERVICE FUNCTIONS

CROSS-REFERENCE TO RELATED APPLICATIONS

This application is a Section 371 National Stage application of International Application No. PCT/FR2014/052616, filed Oct. 14, 2014, the content of which is incorporated herein by reference in its entirety, and published as WO 2015/055945 on Apr. 23, 2015, not in English.

FIELD OF THE DISCLOSURE

The present invention relates to the field of telecommunications, and in particular communications networks that make use of the Internet protocol (IP). More particularly, the present invention relates to managing IP networks with added value, i.e. networks capable of performing processing that is differentiated depending on the nature of the data traffic being transported in the network.

BACKGROUND OF THE DISCLOSURE

Such traffic processing is performed by means of devices known as service functions, and referred to below as SF functions. Among the SF functions commonly used, there are to be found, by way of example:
quality of service functions, such as marking and classifying traffic or conditioning and scheduling traffic;
security functions, such as encrypting traffic, installing and actuating filters defined using access control lists maintained by certain routers of the IP network, and also IPv4 or IPv6 firewalls;
network address translation (NAT) functions such as NAT64 functions (mechanisms enabling IPv6 clients to communicate with IPv4 servers);
probe functions such as deep packet inspection (DPI), e.g. for parental control purposes;
functions for personalizing or optimizing Internet connections, such as "TCP Optimizer";
functions for optimizing video content; or indeed
functions for inserting information into headers of the hypertext transfer protocol (HTTP).

SF functions may be hosted by all kinds of equipment, e.g. a router, a server, or a switch. Furthermore, a single piece of equipment may host one or more SF functions. In the context of the present invention, a node of an IP network is said to be "associated" with an SF function when that SF function is hosted on the node or is accessible via the node: furthermore, a node associated with at least one SF function is referred to below as an "SF node".

Installing a value-added service that benefits from a differentiated traffic transport policy generally requires a plurality of SF functions to be combined (which may indeed be hosted on one or more nodes of the network), possibly in an order that is characteristic of the flow direction of the traffic (e.g. from the Internet to a terminal or from a terminal to the Internet), in order to form functional chains. The term "service function chain" (SFC) designates an ordered sequence of SF functions. In other words, the chain of SF functions gives a list of SF functions that are to be used for processing a data stream in a manner that is characteristic of said service, and gives the order in which the functions are to be used sequentially for processing the stream.

For example, transmission control protocol (TCP) traffic sent by clients who do not have an IPv6 protocol stack may imply chaining a TCP optimization function, an IPv6 firewall function, and a NAT64 function in order to enable those clients to access IPv4 content that is available on the Internet; and the processing of TCP traffic going to such IPv6 clients may involve chaining an IPv4 firewall function and a NAP64 function in order to enable such clients to receive said IPv4 content that is available on the Internet. Another example is that of a virtual private network (VPN) service that makes use of transport and routing functions combined with quality of service and security functions distributed in various elements making up the IP network that supports the VPN, or in elements that are connected to the support network, such as a firewall.

Explicit indicator means (e.g. marking conveyed by each packet forming part of a given stream) are then necessary in order to inform to the equipment hosting the individual SF functions about the chains of which they form a part in order to process the stream(s) associated with the chain. Each piece of equipment hosting at least one individual SF function forming part of an SFC then refers to that explicit indication in order to decide how to process each packet forming part of said stream.

Service function chaining techniques are recent. The state of the art shows that the first development of this service function chaining technique relies on approaches that are monolithic and involve only one manufacturer.

Thus, the article by M. Boucadair, C. Jacquenet, R. Parker, D. Lopez, J. Guichard, and C. Pignataro, entitled "Service Function Chaining: Framework & Architecture draft-boucadair-sfc-framework-00" (available at the following address http://tools.ietf.org/html/draft-boucadair-sfc-framework-00), describes a procedure for creating a chain of service functions. It also describes a generic service function chaining architecture and the functional entities needed for installing such an architecture. That article in particular gives the responsibility for constructing SFCs to entities that it calls policy decision points (PDPs).

In this respect, it should be recalled that the resource allocation protocol (RAP) working group of the Internet engineering task force (IETF) has defined, in a document RFC 2753, a functional architecture that is specific to the management of networks implementing one or more policies (such as traffic transport and routing policies, or quality of service policies, or indeed security policies such as encrypting the transmitted data). In particular, that architecture defines devices referred to as PDPs, which in the context of service function chaining are responsible for taking decisions about the structuring of service function chains relying on a set of SF functions, and are responsible for notifying these decisions to the nodes of the network that are involved in deploying and operating said service. In particular, the PDP is responsible for taking decisions making it possible to apply various differentiated traffic processing policies by one or more nodes of the network, and that leads to ad hoc functions being configured in the network nodes in question. PDP devices may be hosted by way of example in a server, a gateway, or a router. In the context of the present invention, the term "PDP node" is used to designate a node hosting a PDP device.

In said article by Boucadair et al., the PDP communicates with the network elements hosting the SF functions and the stream classification functions, to give them instructions relating to installing differentiated traffic processing, characterized by a variety of service function chains used for processing all of the traffic streams transported in the network, as a function of their respective natures. The article specifies in particular that the PDP needs to have knowledge of the list of service functions that are active in the network and also of their locations; nevertheless, that article does not specify how the PDP can acquire such knowledge.

Conventionally, the list of SF service functions is configured in static manner. The configuration procedure consists in storing in a file that is local to the PDP all of the information relating to SF functions (complete configuration) or merely a list of SF function identifiers (partial configuration). With partial configuration, the PDP needs to make use of a domain name system (DNS) service for resolving identifiers in order to recover other useful information (e.g. one or more IPv4 or IPv6 addresses).

Unfortunately, that conventional configuration suffers from several drawbacks.

Firstly, it is difficult to maintain a service database that is constantly up to date and that matches the dynamics of the network services that are to be produced. This is a particularly severe constraint when the list of service functions to be activated for processing a given traffic stream is large and the combinatorics of the SF functions making up such a list is often complex.

Secondly, the DNS service cannot give the PDP dynamic information about major events (that might affect the decision-making process of the PDP), such as the introduction of new SF functions or SF functions additional to the existing SF functions but of the same kind, or the configuration of a new redundancy group or "cluster" (e.g. a server cluster) or a given service function so as to optimize the robustness of the service function chains, or indeed the capacity to indicate that a service function is unavailable.

Thirdly, by its very nature, static configuration is incompatible with the principle of automating the service production process. Static configuration is also incompatible with operational practices that consist in dedicating a team of network administrators to each SF function, and in separating the teams in charge of planned maintenance of the network and the equipment making it up, from the teams in charge of operating certain segments of the network, since in this context such operating practices will tend to put into question the overall consistency of management operations (configuring and operating SF functions) at the scale of the network, with the risk of degrading the quality level associated with supplying a given network service.

SUMMARY

Thus, in a first aspect, the present invention relates to a discovery method for dynamically discovering service functions in an IP network comprising at least one "PDP" node responsible for taking decisions relative to the structuring of a service relying on a set of service functions, referred to as "SF" functions, and for notifying the decisions to other nodes of said IP network, and at least one "SF" node associated with at least one SF function hosted on said SF node or accessible via said SF node. Said method is remarkable in that it comprises the following steps:
the PDP node receiving an announcement message sent by the SF node, said announcement message indicating at least one identifier and the location of said SF function associated with the SF node; and
the PDP node updating a list of SF functions on the basis of information taken from said announcement message.

It should be observed that the invention is compatible with all types of (fixed or mobile) IP networks, and with all dynamic routing protocols implemented in such networks. It should also be observed that a node of the network may optionally host both a PDP device and one or more SF functions.

By means of these provisions, mutual discovery between PDP node(s) and SF nodes is dynamic, since it takes place automatically wherever there are changes in the network, and this is done without any need to reboot the network.

A network operator can then advantageously:
minimize the risks of error associated with a static configuration procedure;
make reliable and optimize the performance of infrastructure that implements the SF function chaining solution by contributing in particular to significantly reducing the time required for producing a network service made up of a plurality of SF functions distributed in a plurality of network elements;
easily install differentiated traffic transport policies with added value that are capable of taking account of the nature of the traffic, and also the service functions that need to be associated with the processing of these various kinds of traffic within an IP network;
automate the process of dynamically constructing service function chains as implemented by a PDP so as to structure a network service that relies on the ordered combination of a set of service functions hosted by one or more pieces of equipment making up the network or connected to the network;
allocate new resources (e.g. activate new SF functions, or SF functions that are additional but of the same kind as already-existing SF functions for traffic load sharing purposes), or on the contrary eliminate certain resources, in order to optimize the differentiated processing of traffic streams transported in the network by means of new or pre-existing service function chains; and
simplify planned maintenance operations in the network, e.g. by automatically notifying a PDP of planned maintenance operations on a particular piece of equipment and by adapting the application of differentiated traffic processing policies accordingly.

According to particular characteristics, said PDP node sends a message to said SF node after said step of the PDP node receiving an announcement message, which sent message is for installing new rules relating to the processing of a particular kind of traffic by the SF function(s) associated with the node, and/or for requesting additional information from the SF node.

By means of these provisions, added value services are produced and operated in a manner that is automatic and dynamic.

According to other particular characteristics, said announcement message is sent by said SF node in response to a declaration message sent by the PDP node and indicating that the PDP node is acting as such.

Thus, in this implementation, the PDP node declares itself to elements of the network at a predetermined rate. When a node associated with at least one SF function receives such a declaration message, it sends information characteristic of the SF function(s) associated with that node to the PDP node that sent the declaration message. This implementation has the advantage of enabling a PDP node to be recognized quickly and automatically by the nodes of the network that are associated with one or more SF functions as soon as the PDP node is connected or activated.

According to still more particular characteristics, the SF node sends a message to said PDP node after said SF node has received said declaration message, which sent message is for providing the PDP node with additional information or for requesting instructions therefrom.

By means of these provisions, added value services are produced and operated in a manner that is automatic and dynamic.

According to still other particular characteristics, said PDP node sends a declaration message to said SF node after said step of receiving an announcement message, which declaration message indicates that the PDP node is acting as such.

Thus, in this implementation, the SF node announces itself to the elements of the network at a predetermined rate or in spontaneous manner. The PDP node(s) then recover(s) information characteristic of the SF functions associated with the SF node, either because a PDP device in question is hosted in one of the nodes of the network that receives such announcement messages, or else because a PDP node in question is connected to one of the nodes of the network that receive such announcement messages. This implementation has the advantage of enabling an SF node to be recognized quickly and automatically by the PDP node(s) as soon as said node is connected or updated.

In a second aspect, the invention provides various devices.

Thus, the invention relates firstly to an IP network node referred to as a "PDP" node, responsible for taking decisions about the structuring of a service relying on a set of service functions referred to as "SF" functions, and for notifying the decisions to other nodes of said IP network. Said PDP node is remarkable in that it possesses means for:
  receiving an announcement message sent by an "SF" node of said IP network that is associated with at least one SF function hosted by said SF node or accessible via said SF node, said announcement message giving at least one identifier together with the location of said SF function associated with said SF node; and
  updating a list of SF functions on the basis of information taken from said announcement message.

Secondly, the invention also relates to a node of an IP network, referred to as an "SF" node, which node is associated with at least one service function, referred to as an "SF" function, hosted on said SF node or accessible via said SF node. Said SF node is remarkable in that it possesses means for:
  receiving a declaration message sent by a said node of said IP network referred to as a "PDP" node, which PDP node is responsible for taking decisions relating to the structuring of a service relying on a set of SF functions, and for notifying these decisions to other nodes of the IP network, said declaration message indicating that the PDP node is acting as such;
  storing the location of said PDP node; and
  responding by sending an announcement message to the PDP node giving at least one identifier together with the location of said SF function associated with the SF node.

Thirdly, the invention also relates to a node of an IP network, referred to as an "SF" node, which node is associated with at least one service function, referred to as an "SF" function, hosted on said SF node or accessible via said SF node. Said SF node is remarkable in that it possesses means for:
  sending an announcement message giving at least one identifier together with the location of said SF function associated with the SF node;
  receiving a declaration message in response from a node of said IP network, referred to as a "PDP node", that is responsible for taking decisions relating to the structuring of a service relying on a set of SF functions and for notifying these decisions to other nodes of the IP network, which declaration message indicates that the PDP node is acting as such; and
  storing the location of said PDP node.

In a third aspect, the invention relates to a system for dynamically discovering service functions in an IP network. Said system is remarkable in that it comprises at least one PDP node as set out briefly above, and at least one SF node as set out briefly above.

The advantages made available by these devices and this system are essentially the same as those made available by the method of dynamically discovering service functions as set out briefly above.

It should be observed that it is possible to embody such devices in the context of software instructions and/or in the context of electronic circuits.

The invention also provides a computer program downloadable from a communications network and/or stored on a medium that is readable by computer and/or executable by a microprocessor. This computer program is remarkable in that it comprises instructions for executing steps of a method as set out briefly above for dynamically discovering service functions, when the program is executed on a computer.

The advantages made available by this computer program are essentially the same as those made available by said method.

BRIEF DESCRIPTION OF THE DRAWINGS

Other aspects and advantages of the invention appear on reading the following detailed description of particular implementations, given as non-limiting examples. The description refers to the accompanying figures, in which:

FIG. 3 shows a packet header defining an SFC in an OSPF network; and

FIG. 4 shows a Type-Length-Value header relating to the content of an SFC in an OSPF network.

DETAILED DESCRIPTION OF ILLUSTRATIVE EMBODIMENTS

Consideration is given to an IP network comprising firstly at least one PDP node and secondly nodes $N_i$ where $i \geq 1$.

Figure 1:
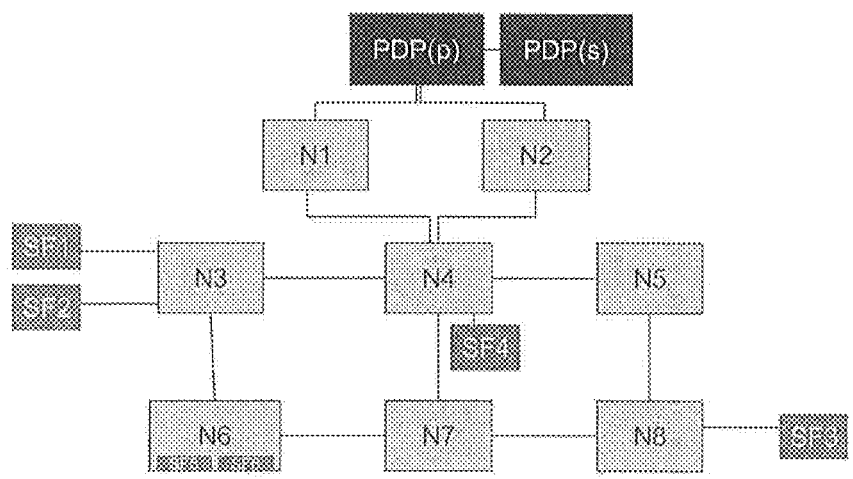
FIG. 1 is a diagram of an example network suitable for performing the invention.

By way of example, FIG. 1 is a diagram of an IP network comprising a "primary" PDP node written PDP(p) in the figure, and a "secondary" PDP node written PDP(s) in the figure. Specifically, it is advisable in general manner to make provision in IP networks of at least one secondary PDP in addition to the primary PDP in order to improve the robustness and the availability of the PDP device in the event of a failure of the primary PDP, and also for the purpose of sharing load.

The network of FIG. 1 also has eight non-PDP nodes written N1 to N8. The node N6 hosts functions SF5 and SF6. The node N3 is connected to a network hosting functions SF1 and SF2. The node N4 is connected to a network hosting functions SF4. The node N8 is connected to an IP network or domain hosting a function SF3. Finally, the nodes N1, N2, N5, and N7 are not associated with any SF function.

The (primary or secondary) PDP node associates an identifier with each SF function, which identifier is written "Service_Function_Identifier". This identifier specifies in unambiguous manner a single or "atomic" function (e.g. a NAT or a firewall). The identifier of the service function is structured as a string of characters. Other SF identification schemes could be adopted within a single administrative domain.

It should be observed that an SF function may be hosted by a plurality of pieces of equipment; consequently, a plurality of IP addresses may be associated with the same identifier of an SF function, for the purposes of locating different instances of that SF function in the network. These IP addresses may be of the same family (i.e. IPv4, IPv6, etc.) or they may be of different families.

Once these service function chains have been structured by the PDP, they are communicated to the nodes of the network. By way of example, they may be communicated in the form of maps describing the SF functions that are to be executed in a certain order for a certain type of data traffic associated with said map. Receiving these maps makes it possible in particular for a node of the network to locate itself on the map, i.e. to determine its own position in the chain, and to make use of the SF functions that are associated therewith in compliance with the instructions of the chain.

Two implementations of the method of the invention are described below.

In a first implementation referred to as "subscription mode", the or each PDP node declares itself with elements of the network, e.g. periodically, by using a point-to-multipoint mode of communication (e.g. multicast). A multicast address (PDP_MCAST_GP) is used for this purpose. The declaration message is referred to as "ADVERT(PDP, Is_Primary)". The parameter "Is_Primary" may be set to "1" by way of example if the PDP in question is the primary PDP, and to "0" if the PDP in question is a secondary PDP. Each PDP node declares its presence and its availability in regular manner to said multicast address PDP_MCAST_GP.

In the event of a PDP node being unavailable, a dedicated message referred to as "WITHDRAW(PDP)" is sent to said multicast address PDP_MCAST_GP in order to inform the nodes of the network of this unavailability.

Each "SF node" as defined above (i.e. each node associated with at least one SF function) needs to register itself with the multicast group associated with the multicast address PDP_MCAST_GP. Each SF node thus listens to the messages sent to the multicast group (PDP_MCAST_GP).

When an SF node receives a declaration message ADVERT(PDP, Is_Primary), it records the location of the PDP node that sent the declaration message, optionally together with the value of the parameter Is_Primary, e.g. by using the IP address that is the source of the declaration message.

The SF node then sends an announcement message to the PDP node for subscription purposes in order to inform it at least of an identifier and the location of the SF function(s) associated with this SF node. This announcement message is a unicast message referred to as SUBSCRIBE, and it includes the mandatory parameters Service_Function_Identifier and Service_Function_Locator (IPv4, IPv6), together with optional parameters.

The mandatory parameters are defined as follows:
Service_Function_Identifier: gives the identifier of the service function; and
Service_Function_Locator (IPv4, IPv6): gives the IPv4 and/or IPv6 address to be used in order to invoke the SF function.

By way of example, the optional parameters may be as follows:
Service_Function_Description: this parameter is used to provide information describing the SF function and its environment (e.g. the identity of the manufacturer of the equipment hosting the SF function);
Service_Function_Capacity: this parameter gives the capacities of an SF node such as, for example: the maximum number of NAT inputs accepted by a NAT function, and/or the capacity of network links and/or the maximum number of IP-in-IP tunnels;
Service_Function_Current_Load: this parameter gives the present load on an SF node; it is used for needs such as load sharing;
Service_Function_Unavailability_Timer: this parameter gives a PDP node the instant from which an SF function will no longer be available, e.g. in the event of planned maintenance operation on the SF node associated with the SF function; the PDP node then needs to cause data traffic to migrate to other equipment providing the same SF function, i.e. it needs to decide to modify the content of the associated service function chain so that the processing of the corresponding traffic can invoke all of the (new) SF functions described in the chain, while minimizing any possible degradation of the network service in question (e.g. risk of losing packets); no information is provided to the PDP node as to when the SF function is to be put back into service; the value "0" for this parameter indicates that the SF function is unavailable immediately;
Service_Function_Reboot_Timer: the teams operating the network periodically reboot network machines, in particular in the context of installing major software versions, for example; this parameter is then used to inform a PDP node that a reboot operation is planned and that it is likely to affect the availability of one or more SF functions; in principle, these SF functions will become available immediately after rebooting; and
Service_Function_Diagnosis: this indicates whether an SF node is compatible with a diagnosis mechanism.

Each SF node must send a SUBSCRIBE announcement message to all of the primary PDP nodes of which it is aware. If no primary PDP node is present, the SF node must send the SUBSCRIBE message to a secondary PDP node of which it is aware. The SF node preferably maintains a cache of active PDP nodes, specifying the (primary/secondary) role of the active PDP nodes; in the event of receiving an above-mentioned WITHDRAW(PDP) message, such an SF node removes the PDP node in question from its list of active PDP nodes.

It should be observed that other information may be sent by an SF node to a PDP node of which it is aware, such as a table of locally-available differentiated traffic processing policies, or a list of available profiles (e.g. characteristic profiles of different classes of service associated with the SF function support and dedicated to quality of service).

When a PDP node receives a SUBSCRIBE announcement message sent by an SF node, the PDP node updates the list of SF functions specifying their respective locations, optionally together with other information such as their functional capacities (as mentioned above) or the load on the associated SF nodes. By means of this data, the PDP node can structure network services relying on an ordered combination of a set of these SF functions.

Optionally, the PDP node may also contact (in unicast mode) an SF node, e.g. in order to apply new rules relating to processing a particular kind of traffic and consequently the SF function(s) associated with the node, or to recover additional information that is not supplied during the discovery stage.

In a second implementation of the invention, referred to as "flooding mode", each SF node announces itself, e.g. periodically, by broadcasting at least one identifier and the location of the SF function(s) associated with the SF node. A multicast group (SF_MCAST_GP) is used for this purpose. To do this, each SF node sends a multicast announcement message referred to as "FLOOD", which message is built up in the same manner as the SUBSCRIBE message of the above-described "subscription mode". It should be observed that other information may be broadcast by an SF node, such as a table of locally-available differentiated traffic treatment policies, or a list of available profiles (e.g. characteristic profiles of different classes of service associated with the SF function support and dedicated to quality of service).

Each PDP node must register with the multicast group (SF_MCAST_GP) used by the SF nodes to announce their presence. The PDP node(s) listens to the message sent to the multicast group (SF_MCAST_GP). When a PDP node receives a FLOOD announcement message, it stores the information contained in the message. It updates a list of SF functions specifying that respective locations, optionally together with other information such as their functional capacities or the loads on the associated SF nodes.

Optionally, the PDP node sends a declaration message ADVERT(PDP, Is_Primary) to the SF node sending the FLOOR message, which declaration message indicates that the PDP node is acting as such. The "Is_Primary" parameter may for example be set to "1" if the PDP in question is the primary PDP, and to "0" if the PDP in question is a secondary PDP. Also optionally, a PDP node may send declaration messages indicating that it is acting as a PDP node other than when receiving a FLOOD announcement message (e.g. periodically).

When an SF node receives such a declaration message ADVERT(PDP, Is_Primary), it stores the location of the PDP node that sent the declaration message, optionally together with the value of the Is_Primary parameter, e.g. by using the IP address that is the source of the declaration message. In this manner, the SF nodes can discover the existence of a plurality of PDP nodes; preferably, such an SF node maintains a cache of active PDP nodes in which the (primary/secondary) role of each active PDP node is given.

Furthermore, the PDP node may also contact an SF node (by unicast and in spontaneous manner), e.g. in order to apply new rules relating to the processing of a particular kind of traffic by the SF function(s) associated with the node, or in order to recover additional information not supplied during the discovery/acquisition stage. By means of this data, the PDP nodes can structure network services relying on an ordered combination of a set of these SF functions.

If the Unavailability_Timer_parameter is given in the FLOOD message, the PDP node needs to update its service function chaining policies in order to cause data traffic that uses the SF function in question to migrate to other equipment offering the same SF function, i.e. it needs to take the decision to modify the content of the associated service function chain so that the processing of the corresponding traffic can invoke all of the (new) SF functions described in the chain, while minimizing any degradation of the network service in question (e.g. risk of losing packets). The migration needs to have taken place before the duration ("timer") given by this parameter has expired.

A PDP node can receive a plurality of FLOOD messages having the same service identifier (Service_Function_Identifier). The PDP node can then apply a load sharing policy in order to share traffic between the various locations of a given SF function, each of these locations being capable of being identified unambiguously by the parameter Service_Function_Locator.

Where appropriate, the FLOOD announcement messages make it possible to discover the existence of a plurality of "instances" of a single SF function: by way of example, this can happen when the same SF function is available in at least two distinct pieces of equipment possessing distinct IP addresses, or in two virtual instances having distinct IP addresses. This discovery mechanism can thus be used by the SF nodes associated with the SF function for the purposes of load sharing, synchronizing states, etc. Furthermore, a function dedicated to load sharing can use the discovery mechanism to implement load sharing policies among different instances of a given SF function.

An SF node may also use a FLOOD announcement message in order to broadcast useful information relating to the SF function(s) associated with the SF node. For example, if one of the associated SF functions becomes unavailable, the SF node sends a FLOOD announcement message that is received by all of the nodes of the network; the PDP takes a decision accordingly (e.g. modifying the affected service function chain), whereas another node associated with an instant of the same SF function could, where appropriate, take over the processing corresponding to this SF function while waiting for the PDP to take its decision. The flood mode thus serves to minimize any risk of service interruption.

The present invention is compatible with the majority of dynamic routing protocols that are currently employed in IP networks, e.g. intermediate system to intermediate system (IS-IS), open shortest path first (OSPF), border gateway protocol (BGP), or other protocols such as service location protocol (SLP). By way of example, there follows a description of the flood mode of the invention as applied to networks implementing the OSPF routing protocol; these networks are referred to below as "OSPF networks".

OSPF is a dynamic routing protocol used in IP networks, and it relies on Djikstra algorithm for calculating routes. The OSPF protocol is described in particular in IETF document RFC 2328 (J. Moy, "OSPF Version 2", STD 54, April 1998).

In the present application example of the invention, a PDP node is connected to the OSPF network. The PDP node is not necessarily an OSPF router. Likewise, the SF functions may be hosted in the OSPF routers of the network, but they can also be located in other pieces of equipment. Naturally, a plurality of SF functions may be hosted in a single OSPF router.

The routers of an OSPF network make use of a link state advertisement (LSA) packet to announce various kinds of information, such as OSPF intra- or inter-area routes. There are several types of LSA packets, including Opaque LSA packets.

Opaque LSA packets provide a generic mechanism for facilitating functional extensions to the OSPF protocol. The information conveyed in Opaque LSA packets may either be used directly by the OSPF protocol, e.g. to refine the route calculation process, or else indirectly by an application or a system that seeks to make use of the resources of an OSPF network in order to distribute some particular information to all of the routers making up the OSPF network. In compliance with IETF document RFC 5250 (L. Berger et al., "The OSPF Opaque LSA option", July 2008), Opaque LSA packets have a standard LSA header followed by an information field aligned on 32 bits, of content that is characteristic of the information distributed in the OSPF network. The coding of this information is of the type, length, value (TLV) type. There are three types of Opaque LSA packet: there are "link-local" type LSA packets known as "type 9", that are not distributed beyond the local link to which the OSPF router issuing the LSA packet is connected, there are "area-local" type LSA packets known as "type 10", that are not distributed beyond the boundaries of the OSPF area to which the OSPF router that issued such a packet belongs, and there are type "AS" LSA packets known as "type 11" that are distributed to all of the OSPF routers making up the autonomous system (AS), regardless of whether the autonomous system is made up of a plurality of OSPF areas. The application of the present invention to IP networks implementing the OSPF protocol relies on using Opaque LSA packets of type 10 or type 11.

An Opaque LSA packet of type 10 or type 11 that describes functional capacities of the equipment making up an IP network enabling the OSPF protocol to be implemented is referred to as a service function chaining LSA (SFC LSA) packet. Automatically discovering such functional capacities facilitates (ordered) chaining of said functions in the context of installing differentiated traffic transport policies within an IP network.

If the PDP device is not hosted in an OSPF router, then its connection router must be configured explicitly in order to announce the PDP device by means of an SFC LSA packet. If the PDP device is hosted in an OSPF router, then the router uses an SFC LSA packet to announce the PDP device.

If an SF function is not hosted in an OSPF router (e.g. because it is hosted in a server connected to the OSPF network), then the router to which the SF function is connected needs to be configured explicitly in order to announce the SF function or the list of SF functions connected to the router. This announcement is performed by sending an SFC LSA packet. If the SF function is hosted in an OSPF router, then the router uses an SFC LSA packet to announce the SF function or the list of SF functions hosted in the router.

SFC LSA packets are distributed in compliance with the procedure described in above-mentioned document RFC 5250, and more precisely in section 3.1 of that document, as appropriate for the types 10 and 11 to which the SFC LSA packet may refer. In general manner, the OSPF routers of the network use SFC LSA packets to announce to all of the OSPF routers of the area or of the domain the SF functions of which they are aware, either because they themselves host at least one SF function, or else because they are directly connected to at least one node hosting at least one SF function.

OSPF packets containing the SFC LSA packet are sent:
when the routers are put into operation ("bootstrap" stage); or
each time an event justifies such an action (e.g. updating the software of a router involving the incorporation of additional SF functions); or
periodically.

On receiving these OSPF packets containing an SFC LSA packet, each OSPF router of the area or of the domain updates its topological database (in particular the information relating to IP access to the SF functions), and it dynamically informs the PDP node(s) of the nature of the SF functions of which it has thus become aware, together with information associated therewith, such as the locations of the SF nodes or their loading.

The manner in which the or each PDP device recovers this information depends on the location of the device: either the PDP device is hosted in an OSPF router (in which case it receives the SFC LSA packet like any other OSPF router of the area or the domain), or else it uses the resources of an appropriate protocol such as BGP link state (BGP-LS) protocol, as described in H. Gredler et al., "North-bound distribution of link-state and TE information using GBP" draft-idr-ls-distribution-03, May 2013.

If the PDP node is not an OSPF router, then the PDP node can:
periodically request its connection router for a list of the SF functions connected to the OSPF network; or
configure its connection router so that the connection router sends it a notification message in order to communicate the list of SF functions connected to the OSPF network; the notification message is produced by its connection router on the occurrence of an event such as a new SF function becoming available, a modification to the information of an SF function, or an SF function becoming unavailable.

Broadcasting the information contained in an SFC LSA packet on the scale of an OSPF area (type 10) or domain (type 11) contributes to mapping the SF service functions that are available and capable of being combined and ordered in compliance with the maps used by routers for processing streams associated with each of those maps. Associating a stream with a given map is the result of classification that is generally performed by the boundary nodes of the domain, or of the OSPF area (as described in the above-mentioned article by Boucadair et al.).

The acquisition of this information enables a PDP node to make its decisions on the basis of functional maps that are then transmitted to the equipment of the network that is involved in processing the corresponding streams, i.e. streams that are to be processed as described in one or another of the maps (using an ordered sequence of SF functions).

The process of automatically discovering functional capacities in accordance with the invention relies, in the present implementation, on using an area-scope Opaque LSA packet, i.e. a packet of type 10.

Figure 2:
FIG. 2 shows an SFC identifier in a network using the OSPF routing protocol.

As shown in FIG. 2, the identifier of the SFC LSA packet is encoded on a byte (cf. RFC 5250), followed by three bytes representing the Instance field. This Instance field is an arbitrary value that is used to maintain a plurality of SFC LSA packets, up to a theoretical maximum of 16777216 SFC LSA packets that can be produced by a single OSPF router. The identifier of the SFC LSA packet is allocated by the Internet Assigned Numbers Authority (IRNA).

The header of the SFC LSA packet complies with a standard header of an LSA packet (cf. RFC 2328) as shown in FIG. 3.

The content of the SFC LSA packet may be made up of a plurality of TLV triplets that represent all of the SF functions known to the OSPF router that has made the announcement. The TLV header is shown in FIG. 4.

The encoding is aligned on 32 bits. Successive TLV triplets are also aligned on 32 bits. The SFC LSA packet contains a single top level TLV triplet (cf. RFC 5250), which gives the nature of the content of the SFC LSA packet, or all of the functional capacities of the OSPF router that generates the SFC LSA packet. This top level TLC triplet is defined as follows: 1—Service Function (SF).

The SF TLV triplet thus describes all of the SF functions associated with a router that has sent an SFC LSA packet. These SF functions are described in a succession of sub-TLV triplets.

The information describing SF functions may be encoded in various ways, depending on implementation considerations and on flexibility in the capacity to described new SF functions. Two examples of encoding sub-TLV triplets are provided in accompanying Tables 1 and 2 in which the value of the type of each sub-TLV triplet refers to one, and only one, elementary SF function.

Naturally, other sub-TLV triplets may be defined as a function of the functional richness of the network equipment, or as a function of the nature of the network services.

To finish, it should be observed that the invention may be implemented within PDP nodes or SF nodes of IP networks by using software and/or hardware components.

The software components may be incorporated in a conventional computer program for managing a network node. That is why, as mentioned above, the present invention also provides a computer system. The computer system comprises, in conventional manner, a central processor unit using signals to control a memory, and also an input unit and an output unit. Furthermore, the computer system may be used to execute a computer program including instructions for performing any one of the methods of the invention for dynamically discovering service functions.

Specifically, the invention also provides a computer program downloadable from a communications network and including instructions for executing steps of a method of the invention for discovering service functions dynamically when it is executed on a computer. The computer program may be stored on a computer readable medium, and it may be executable by a microprocessor.

The program may use any programming language, and it may be in the form of source code, object code, or code intermediate between source code and object code, such as in a partially complied form, or in any other desirable form.

The invention also provides a non-removable, or partially or completely removable data medium that is readable by computer, and that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or magnetic recording means such as a hard disk, or indeed a universal serial bus (USB) flash drive.

Furthermore, the data medium may be a transmissible medium such as an electrical or optical signal, suitable for being transported via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the methods of the invention for dynamically discovering service functions.

TABLE 1

| Sub-TLV type | Sub-TLV name | Description |
|---|---|---|
| 1 | Service_Function_ Identifier | The content of the value field of this sub-TLV triplet may be summarized as a numerical character or a string of characters unambiguously identifying an SF function. The value of this field may vary from one domain to another for a given function, and it is therefore characteristic of the identification schemes used by the entity responsible for managing the service function chaining domain. A PDP device may optionally be signaled as being an SF function. |
| 2 | Service_Function_Locator | This sub-TLV triplet describes the IPv4 address or the IPv6 address used for locating an SF function in the OSPF network. This sub-TLV triplet may be present several times over (e.g. a dual-stack SF function). |
| 3 | Service_Function_ Description | This sub-TLV triplet summarizes the SF function with a character string contained in the "value" field, e.g. "NAT64 function hosted by router X", where X is the information contained in the "Advertising Router" field of the header of the SFC LSA packet. |
| 4 | Service_Function_Reboot_ Timer | This sub-TLV triplet describes the value of the timer associated with rebooting an SF function. This timer indicates that a reboot operation is planned for this function. The SF function will become available immediately after rebooting. |
| 5 | Service_Function_Diagnosis | This sub-TLV triplet indicates whether the SF function is compatible with a diagnosis mechanism. |

TABLE 2

| Sub-TLV type | Sub-TLV name | Description |
|---|---|---|
| 1 | QoS traffic marking and classification service function | This sub-TLV triplet describes the nature of the traffic marking and classification function and in particular includes the values "per hop behaviors" (PHB) such as "Best Effort", "Assured Forwarding" (AS), or "Expedited Forwarding" (EF). |

TABLE 2-continued

| Sub-TLV type | Sub-TLV name | Description |
|---|---|---|
| 2 | QoS traffic conditioning service function | This sub-TLV triplet describes the nature of the traffic conditioning service function, and in particular incorporates as a value the medium of a token bucket algorithm. |
| 3 | QoS traffic scheduling service function | This sub-TLV triplet describes the nature of the scheduling function and incorporates in particular as values support for the Weighted Fair Queuing (WFQ), Priority Queuing (PQ) , and Class-Based Queuing (CBQ) algorithms. |
| 4 | Network address translation service function | This sub-TLV triplet describes the nature of the compatible NAT function. Its values may be NAT44, NAT64, and DS-Lite. |
| 5 | Security service function | This sub-TLV triplet describes the nature of the compatible security function. In particular its values include support for a suite of IPsec protocols (support for Authentication Header (AH), and Encrypted Security Payload (ESP)), and also support for a firewall function (e.g. access control lists, traffic filters, or parental control). |
| 6 | Deep packet inspection (DPI) service function | This sub-TLC triplet specifies support for a DPI function. |

Although the present disclosure has been described with reference to one or more examples, workers skilled in the art will recognize that changes may be made in form and detail without departing from the scope of the disclosure and/or the appended claims.

The invention claimed is:

1. A discovery method for dynamically discovering service functions in an IP network comprising at least one Policy Decision Point ("PDP") node responsible for taking decisions relative to the structuring of a service relying on a set of service functions, referred to as "SF" functions, and for notifying the decisions to other nodes of said IP network, and at least one "SF" node associated with at least one SF function hosted on said SF node or accessible via said SF node, said method comprising the following acts:
the PDP node receiving an announcement message sent by the SF node, said announcement message indicating at least one identifier and a location of said SF function associated with the SF node; and
the PDP node updating a list of SF functions on the basis of information taken from said announcement message,
wherein said service functions enable performing processing that is differentiated depending on a nature of data traffic being transported in the IP network.

2. The discovery method according to claim 1, wherein said PDP node sends a message to said SF node after said act of the PDP node receiving an announcement message, wherein the sent message is configured to perform at least one of installing new rules relating to the processing of a particular kind of traffic by the SF function or functions associated with the node, or requesting additional information from the SF node.

3. The discovery method according to claim 1, wherein said announcement message is sent by said SF node in response to a declaration message sent by the PDP node and indicating that the PDP node is acting as such.

4. The discovery method according to claim 3, wherein the SF node sends a message to said PDP node after said SF node has received said declaration message, wherein the sent message is for providing the PDP node with additional information or for requesting instructions therefrom.

5. The discovery method according to claim 3, wherein, after receiving said declaration message, said SF node stores a location of said PDP node that sent the declaration message.

6. A discovery method according to claim 1, wherein said PDP node sends a declaration message to said SF node after said act of receiving an announcement message, wherein the declaration message indicates that the PDP node is acting as such.

7. The discovery method according to claim 6, wherein, after receiving said declaration message, said SF node stores a location of said PDP node that sent the declaration message.

8. An IP network node referred to as a Policy Decision Point ("PDP") node, responsible for taking decisions about structuring of a service relying on a set of service functions referred to as "SF" functions, and for notifying the decisions to other nodes of said IP network, the PDP node comprising:
means for receiving an announcement message sent by an "SF" node of said IP network that is associated with at least one SF function hosted by said SF node or accessible via said SF node, said announcement message giving at least one identifier together with a location of said SF function associated with said SF node; and
means for updating a list of SF functions on the basis of information taken from said announcement message,
wherein said service functions enable performing processing that is differentiated depending on a nature of data traffic being transported in the IP network.

9. A node of an IP network, referred to as an "SF" node, which node is associated with at least one service function, referred to as an "SF" function, hosted on said SF node or accessible via said SF node, the SF node comprising:
means for receiving a declaration message sent by a node of said IP network referred to as a Policy Decision Point ("PDP") node, which PDP node is responsible for taking decisions relating to structuring of a service relying on a set of SF functions, and for notifying these decisions to other nodes of the IP network, said declaration message indicating that the PDP node is acting as such;
means for storing the location of said PDP node; and
means for responding by sending an announcement message to the PDP node giving at least one identifier together with a location of said SF function associated with the SF node,
wherein said service functions enable performing processing that is differentiated depending on a nature of data traffic being transported in the IP network.

10. A node of an IP network, referred to as an "SF" node, which node is associated with at least one service function, referred to as an "SF" function, hosted on said SF node or accessible via said SF node, the SF node comprising:
- means for sending an announcement message giving at least one identifier together with a location of said SF function associated with the SF node;
- means for receiving a declaration message in response from a node of said IP network, referred to as a Policy Decision Point ("PDP") node, that is responsible for taking decisions relating to structuring of a service relying on a set of SF functions and for notifying these decisions to other nodes of the IP network, wherein the declaration message indicates that the PDP node is acting as such; and
- means for storing a location of said PDP node,
- wherein said at least one service function enables performing processing that is differentiated depending on a nature of data traffic being transported in the IP network.

11. A system for dynamically discovering service functions in an IP network, the system being comprising:
- at least one IP network node referred to as a Policy Decision Point ("PDP") node, responsible for taking decisions about structuring of a service relying on a set of service functions referred to as "SF" functions, and for notifying the decisions to other nodes of said IP network, the PDP node comprising:
- means for receiving an announcement message sent by an "SF" node of said IP network that is associated with at least one SF function hosted by said SF node or accessible via said SF node, said announcement message giving at least one identifier together with a location of said SF function associated with said SF node; and
- means for updating a list of SF functions on the basis of information taken from said announcement message; and
- at least one SF node, including the SF node that sent the announcement message, the at least one SF node comprising:
- means for storing a location of said PDP node; and
- at least one of:
  - means for receiving a declaration message sent by said PDP node and indicating that the PDP node is acting as a PDP node; and
  - means for responding to the declaration message by sending the announcement message to the PDP node giving the at least one identifier together with the location of said SF function associated with the SF node;
  - or
  - means for sending the announcement message; and
  - means for receiving the declaration message from the PDP node in response to the announcement message,
- wherein said service functions enable performing processing that is differentiated depending on a nature of data traffic being transported in the IP network.

12. The system according to claim 11, wherein the IP network implements an open shortest path first (OSPF) routing protocol.

13. The system according to claim 11, wherein in the IP network implements an intermediate system to intermediate system (IS-IS) routing protocol.

14. The system according to claim 11, wherein the IP network implements a border gateway protocol (BGP) routing protocol.

15. Non-removable, or partially or totally removable non-transitory computer-readable data storage medium including computer program code instructions stored thereon for executing a method for dynamically discovering service functions for dynamically discovering service functions in an IP network, when the instructions are executed by a processing unit of at least one Policy Decision Point ("PDP") node in an IP network, responsible for taking decisions relative to structuring of a service relying on a set of service functions, referred to as "SF" functions, and for notifying the decisions to other nodes of said IP network, and at least one "SF" node associated with at least one SF function hosted on said SF node or accessible via said SF node, wherein the method comprises the following acts performed by the at least one PDP node:
- the PDP node receiving an announcement message sent by the SF node, said announcement message indicating at least one identifier and a location of said SF function associated with the SF node; and
- the PDP node updating a list of SF functions on the basis of information taken from said announcement message,
- wherein said service functions enable performing processing that is differentiated depending on a nature of data traffic being transported in the IP network.

* * * * *